US009660237B2

United States Patent
DeKeuster et al.

(10) Patent No.: US 9,660,237 B2
(45) Date of Patent: May 23, 2017

(54) MANIFOLD VENT CHANNEL FOR A BATTERY MODULE

(71) Applicant: Johnson Controls Technology Company, Holland, MI (US)

(72) Inventors: Richard M. DeKeuster, Racine, WI (US); Ronald J. Dulle, Mequon, WI (US)

(73) Assignee: Johnson Controls Technology Company, Holland, MI (US)

( * ) Notice: Subject to any disclaimer, the term of this patent is extended or adjusted under 35 U.S.C. 154(b) by 145 days.

(21) Appl. No.: 14/791,000

(22) Filed: Jul. 2, 2015

(65) Prior Publication Data

US 2016/0036023 A1 Feb. 4, 2016

Related U.S. Application Data

(60) Provisional application No. 62/031,709, filed on Jul. 31, 2014.

(51) Int. Cl.
 *H01M 2/12* (2006.01)
 *H01M 10/42* (2006.01)

(52) U.S. Cl.
 CPC .......... *H01M 2/12* (2013.01); *H01M 2/1211* (2013.01); *H01M 2/1217* (2013.01); *H01M 10/425* (2013.01); *H01M 2220/20* (2013.01)

(58) Field of Classification Search
 CPC ............ H01M 2/1211; H01M 2/1217; H01M 2220/20; H01M 10/425; H01M 2/12; H01M 2/206; H01M 2/1077; H01M 10/482; B60R 16/03; H02J 7/0063; G01R 31/362; H05K 1/16; H05K 2201/10545
 See application file for complete search history.

(56) References Cited

U.S. PATENT DOCUMENTS

| 5,166,775 | A  | 11/1992 | Bartilson     |
| 2006/0166081 | A1 | 7/2006 | Sauter et al. |
| 2009/0111007 | A1 | 4/2009 | Naganuma      |

(Continued)

FOREIGN PATENT DOCUMENTS

JP 2013171746 9/2013

OTHER PUBLICATIONS

PCT/US2015/042378 International Search Report and Written Opinion dated Oct. 8, 2015.

*Primary Examiner* — Mark F Huff
*Assistant Examiner* — Monique Wills
(74) *Attorney, Agent, or Firm* — Fletcher Yoder, P.C.

(57) ABSTRACT

The present disclosure includes a battery module having a housing that includes a lid and a battery cell with a battery cell terminal and a battery cell vent on an end of the battery cell. The battery cell vent is configured to exhaust battery cell effluent. The battery module includes a printed circuit board positioned in an immediate vent direction of the battery cell, a vent shield channel positioned between the battery cell vent and the printed circuit board along the immediate vent direction of battery cell effluent, where the vent shield plate is immediately adjacent to the printed circuit board and configured to block the effluent from contacting the printed circuit board and to redirect the battery cell effluent along a desired vent path, and a module vent fluidly coupled to the desired vent path and configured to direct the battery cell effluent out of the battery module.

25 Claims, 11 Drawing Sheets

(56) References Cited

U.S. PATENT DOCUMENTS

| | | |
|---|---|---|
| 2013/0252032 A1 | 9/2013 | Zhao et al. |
| 2013/0330579 A1 | 12/2013 | Ejiri et al. |
| 2015/0072175 A1 | 3/2015 | DeKeuster et al. |
| 2015/0072193 A1* | 3/2015 | Balk .................. B60R 16/03 |
| | | 429/82 |

* cited by examiner

MANIFOLD VENT CHANNEL FOR A BATTERY MODULE

CROSS REFERENCE TO RELATED APPLICATIONS

This application claims priority from and the benefit of U.S. Provisional Application Ser. No. 62/031,709, entitled "MANIFOLD VENT CHANNEL," filed Jul. 31, 2014, which is hereby incorporated by reference.

BACKGROUND

The present disclosure relates generally to the field of batteries and battery modules. More specifically, the present disclosure relates to a vent channel for a battery module.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives, or contributes to drive, the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, battery modules may be subject to releases of pressurized gas (e.g., effluent) from electrochemical cells to prevent issues related to accumulated pressure within the cells (e.g., thermal runaway). It is now recognized that improved techniques for venting gases from battery modules may be desirable to avoid issues associated with accumulation of gases in the battery module. For example, in certain configurations, the vented gases may be expelled from the electrochemical cells (e.g., during overcharge of the electrochemical cell) near module components, which may be negatively impacted by the temperature and/or composition of the vented gases. Accordingly, it may be desirable to mitigate such negative impacts by protecting exposed battery module components and/or by redirecting a flow of the gases out of the battery module.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to a battery module having a housing that includes a lid and a battery cell disposed in the housing. The battery cell includes a battery cell terminal and a battery cell vent on an end of the battery cell, and the battery cell vent is configured to exhaust battery cell effluent into the housing. The battery module includes a printed circuit board, where the printed circuit board is positioned in an immediate vent direction of the battery cell effluent, a vent shield channel positioned between the battery cell vent and the printed circuit board along the immediate vent direction of the battery cell effluent, where the vent shield channel is immediately adjacent to the printed circuit board and configured to block the battery cell effluent from contacting the printed circuit board and to redirect the battery cell effluent along a desired vent path, and a module vent fluidly coupled to the desired vent path and configured to direct the battery cell effluent out of the battery module.

The present disclosure also relates to a battery module that includes a housing and a stack of prismatic lithium-ion battery cells disposed in the housing. Each battery cell of the stack of prismatic lithium-ion battery cells includes a battery cell terminal and a battery cell vent, and the battery cell vent of each battery cell of the stack of prismatic lithium-ion battery cells is configured to exhaust battery cell effluent in an immediate vent direction. The battery module also includes a printed circuit board disposed in the housing, where the printed circuit board is positioned along the immediate vent direction of the stack of prismatic lithium-ion battery cells and a vent shield channel fixedly coupled to a surface of the printed circuit board, where the vent shield channel is positioned between the respective battery cell vents of all battery cells of the stack of prismatic lithium-ion battery cells and the printed circuit board such that the vent shield channel is configured to block battery cell effluent from contacting the printed circuit board and to redirect the battery cell effluent toward a vent fluidly coupled to the vent shield channel and configured to direct the battery cell effluent out of the battery module.

The present disclosure also relates to a battery module that includes a vent shield channel positioned between a stack of battery cells and a printed circuit board, where each battery cell of the stack of battery cells comprises a battery cell vent and a battery cell terminal, the battery cell vent of each battery cell of the stack of battery cells is configured to exhaust battery cell effluent into a housing of the battery module, and the vent shield channel is configured to block the battery cell effluent from contacting the printed circuit board and to redirect the battery cell effluent towards a desired vent path.

DRAWINGS

Various aspects of this disclosure may be better understood upon reading the following detailed description and upon reference to the drawings in which.

DETAILED DESCRIPTION

Figure 1:
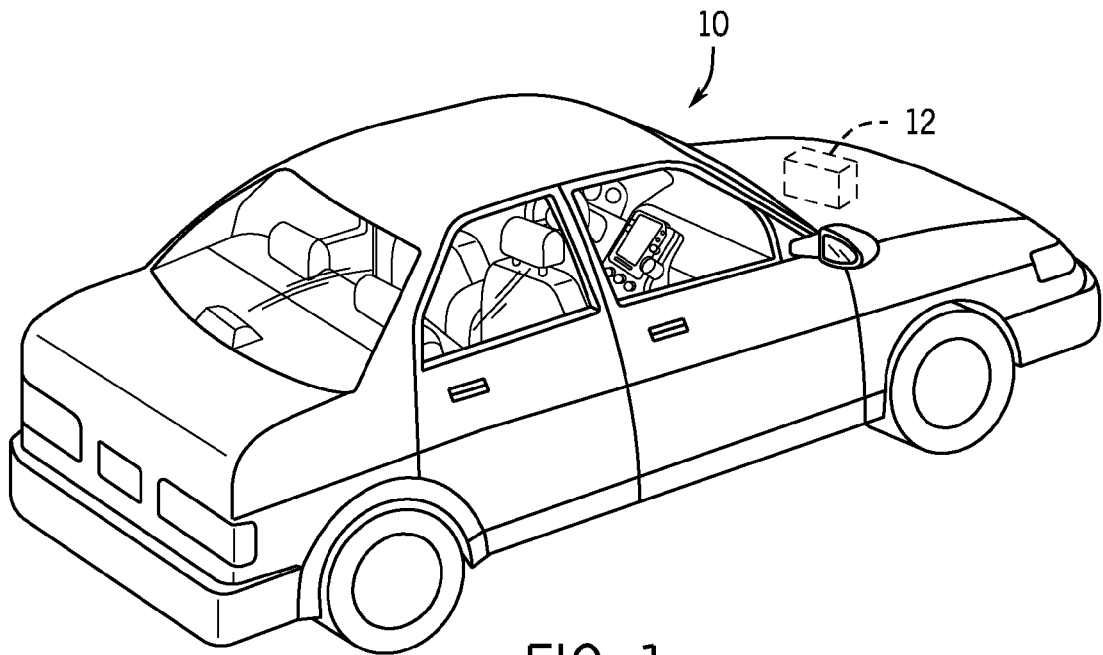
FIG. 1 is a perspective view of a vehicle having a battery system configured in accordance with present embodiments to provide power for various components of the vehicle.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a number of battery cells (e.g., lithium-ion (Li-ion) electrochemical cells) arranged to provide particular voltages and/or currents useful to power, for example, one or more components of an xEV. As another example, battery modules in accordance with present embodiments may be incorporated with or provide power to stationary power systems (e.g., non-automotive systems).

Battery modules, in accordance with the present disclosure may include one or more individual battery cells that may release pressurized gases into the housing of the battery module. For example, the electrochemical cells may be susceptible to an increase in heat during normal and/or abnormal operation (e.g., during overcharge), which may cause an increase in internal pressure. Vents may be integrated into the electrochemical cells to release pressurized gases into the battery module housing under certain circumstances (e.g., when a pressure in the electrochemical cell reaches or exceeds a threshold value). However, because the battery modules often include temperature sensitive components (e.g., electronic components on a printed circuit board), it may be desirable to shield such components from the pressurized gases or to redirect the gases out of the battery module via a predetermined venting path to mitigate any damage to the sensitive battery module components.

In accordance with present embodiments, the battery module housing may include a vent structure (e.g., vent shield channel, venting chamber, vent, module cover, housing) configured to block pressurized gases from contacting temperature sensitive components disposed along the venting path. For example, a vent shield may be positioned along the vent path to protect sensitive module components (e.g., electronics) from the vented gases. Moreover, the vent shield may redirect the vented gas to a vent chamber and/or toward a desired vent path to channel the gas (e.g., battery cell effluent) out of the battery module, while avoiding contact with the sensitive components (e.g., a printed circuit board or other electronic components). In certain embodiments, the vent structure may be configured to couple to a printed circuit board (PCB) assembly of the battery module to shield the PCB assembly from the pressurized gases and to direct the gases out of the battery module.

In one aspect, the present disclosure includes embodiments of a battery module having a vent shield channel configured to block gases vented from the electrochemical cells from contacting and/or overheating sensitive components (e.g., the PCB) of the battery module. The vent shield channel may be desirable when sensitive components are positioned within an immediate vent direction (e.g., an unobstructed venting direction) of the battery cell effluent.

To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
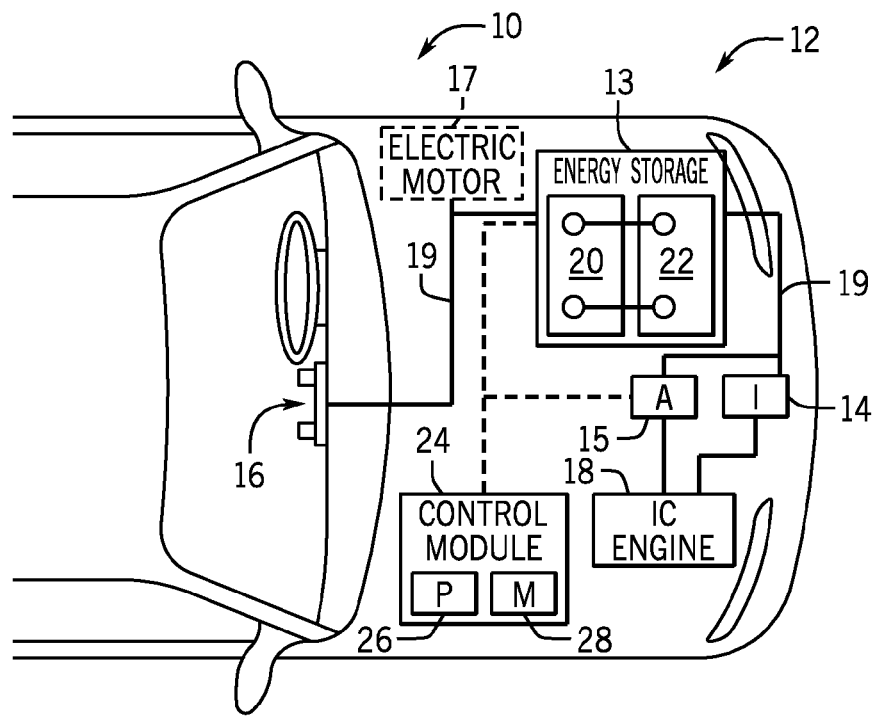
FIG. 2 is a cutaway schematic view of an embodiment of the vehicle and the battery system of FIG. 1.

A more detailed view of the battery system 12 is described in FIG. 2. As depicted, the battery system 12 includes an energy storage component 13 coupled to an ignition system 14, an alternator 15, a vehicle console 16, and optionally to an electric motor 17. Generally, the energy storage component 13 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 13 supplies power to the vehicle console 16 and the ignition system 14, which may be used to start (e.g., crank) an internal combustion engine 18.

Additionally, the energy storage component 13 may capture electrical energy generated by the alternator 15 and/or the electric motor 17. In some embodiments, the alternator 15 may generate electrical energy while the internal combustion engine 18 is running. More specifically, the alternator 15 may convert the mechanical energy produced by the rotation of the internal combustion engine 18 into electrical energy. Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some embodiments, the energy storage component 13 may capture electrical energy generated by the alternator 15 and/or the electric motor 17 during regenerative braking. As such, the alternator 15 and/or the electric motor 17 are generally referred to herein as a regenerative braking system.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12 volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a lithium ion (e.g., a first) battery module 20 and a lead-acid (e.g., a second) battery module 22, which each includes one or more battery cells. In other embodiments, the energy storage component 13 may include any number of battery modules. Additionally, although the lithium ion battery module 20 and lead-acid battery module 22 are depicted adjacent to one another, they may be positioned in different areas around the vehicle 10. For example, the lead-acid battery module 22 may be positioned in or about the interior of the vehicle 10 while the lithium ion battery module 20 may be positioned under the hood of the vehicle 10.

In some embodiments, the energy storage component 13 may include multiple battery modules to utilize multiple different battery chemistries. For example, when the lithium ion battery module 20 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 24. More specifically, the control module 24 may control operations of components in the battery system 12, such as relays (e.g., switches) within energy storage component 13, the alternator 15, and/or the electric motor 17. For example, the control module 24 may regulate an amount of electrical energy captured/supplied by each battery module 20 or 22 (e.g., to de-rate and re-rate the battery system 12), perform load balancing between the battery modules 20 and 22, determine a state of charge of each battery module 20 or 22, determine temperature of each battery module 20 or 22, control voltage output by the alternator 15 and/or the electric motor 17, and the like.

Accordingly, the control unit 24 may include one or more processors 26 and one or more memory components 28. More specifically, the one or more processors 26 may include one or more application specific integrated circuits (ASICs), one or more field programmable gate arrays (FPGAs), one or more general purpose processors, or any combination thereof. Additionally, the one or more memory components 28 may include volatile memory, such as random access memory (RAM), and/or non-volatile memory, such as read-only memory (ROM), optical drives, hard disc drives, or solid-state drives. In some embodiments, the control unit 24 may include portions of a vehicle control unit (VCU) and/or a separate battery control module.

As discussed previously, individual battery cells of the battery module 20 may experience pressure buildup as a result of accumulation of electrochemical cell effluent gases (e.g., during overcharge of the battery cell). However, the battery module 20 may include components that are sensitive to increased temperatures caused by the effluent, and/or components that may be corroded or otherwise subject to damage caused by the chemical makeup of the effluent. Therefore, it may be desirable to include a vent shield channel in the battery module 20 to prevent contact with such sensitive module components and/or to redirect the effluent along a desired vent path that may mitigate damage to the sensitive components. It is now recognized that a vent shield channel positioned along an immediate vent direction (e.g., unobstructed vent direction) of the effluent may absorb a majority of thermal and kinetic energy from the effluent as well as redirect the effluent out of the battery module 20. Although the vent shield channel may not completely prevent exposure of the sensitive components to the effluent, it may provide enhanced protection, thereby increasing the life of the battery module 20.

Figure 3:
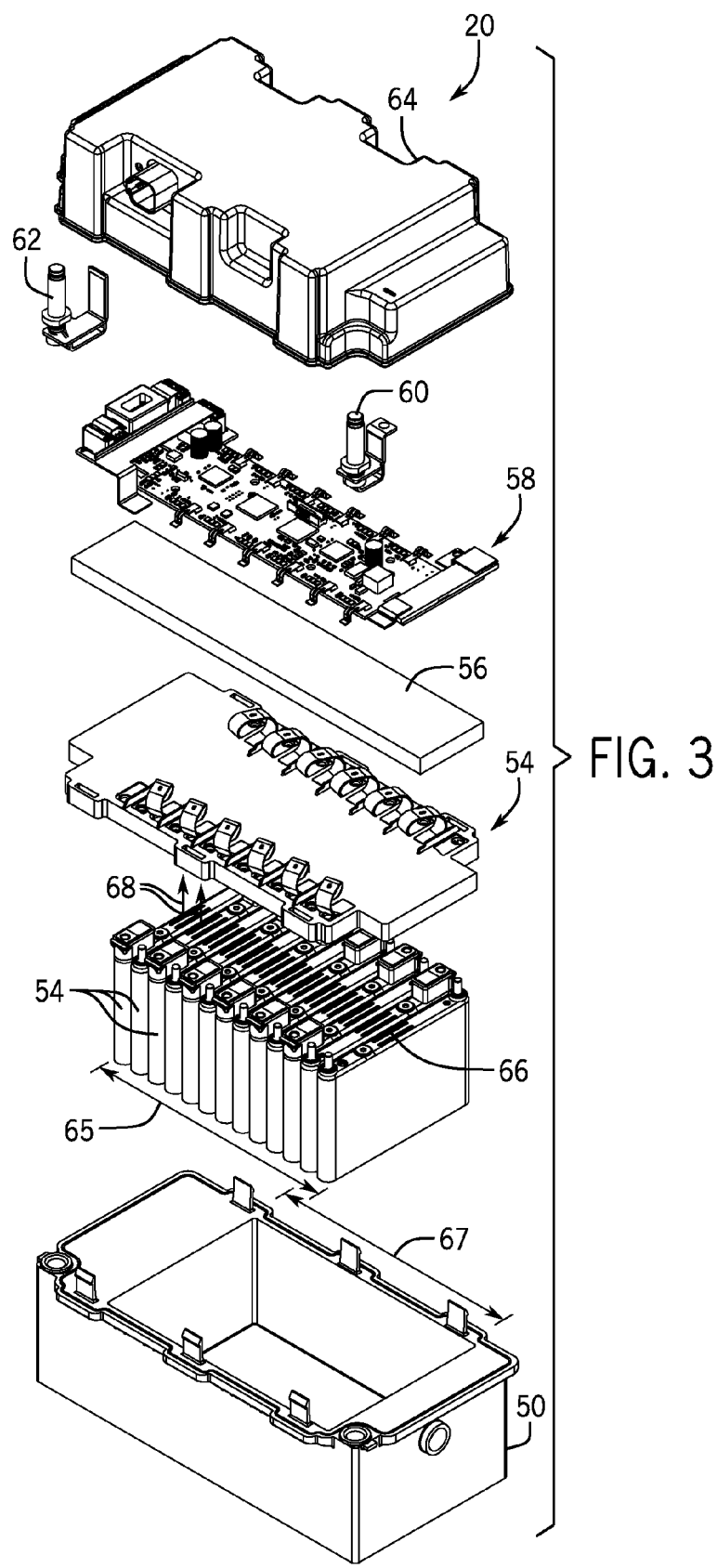
FIG. 3 is an exploded perspective view of a battery module having a vent shield channel, in accordance with an aspect of the present disclosure.

FIG. 3 is an exploded perspective view of the battery module 20 having a vent shield channel, in accordance with aspects of the present disclosure. As illustrated, the battery module 20 may include, among other things, a lower housing 50, battery cells 52 disposed in the lower housing 50, a lid assembly 54, a vent shield channel 56, a printed circuit board (PCB) assembly 58, a first battery module terminal 60, a second battery module terminal 62, and a cover 64. The lower housing 50 and the cover 64 form an outer enclosure for the battery module 20, and the battery cells 52, the lid assembly 54, the vent shield channel 56, and the PCB assembly 58 are held within this enclosure. Upon assembly, the first and second battery module terminals 60 and 62 may protrude out of the enclosure formed by the lower housing 50 and the cover 64 to facilitate attachment of an outside electric load to the battery module 20. In certain embodiments, each of the illustrated sections (e.g., lower housing 50, lid assembly 54, vent shield channel 56, PCB assembly 58, terminals 60 and 62, and cover 64) may include features that facilitate efficient assembly of a relatively compact battery module 20.

As illustrated, the battery cells 52 may be arranged in a face-to-face, or stacked, orientation relative to each other within the lower housing 50. For example, a stack of the battery cells 52 may include a cumulative length 65. Accordingly, the module housing 50 may include a corresponding length 67 configured to receive the stack and enable the stack to fit within the housing 50. The battery cells 52 may be coupled in series within the battery module 20 to provide a desired voltage output. For example, to output a desired voltage of approximately 48V, each of the thirteen illustrated battery cells 52 may be configured to provide a voltage within a range of approximately 3.5V to 3.9V. Although the illustrated embodiment includes thirteen battery cells 52, the battery module 20 may include any number of individual battery cells 52 coupled together in series, parallel, or a combination thereof, to provide the desired voltage output at a desired capacity. In certain embodiments, the lid assembly 54 may include features (e.g., bus bars) that are configured to electrically couple the battery cells 52 to one another. Additionally, the lid assembly 54 may include further electrical connections configured to electrically couple a stack of battery cells 52 to the first and second battery module terminals 60, 62.

As discussed above, under certain conditions, the battery cells 52 may vent gas (e.g., battery cell effluent) into the enclosure of the battery module 20. In certain embodiments, the battery cells 52 may be configured to vent accumulated gas (e.g., battery cell effluent) when a pressure within an individual battery cell 52 reaches a threshold value. For example, the pressure in the individual battery cell 52 may increase when the individual battery cell 52 is overcharged. Accordingly, when the pressure reaches the threshold value, a vent 66 of the individual battery cell 52 may open (e.g., as a result of the pressure force exerted upon the vent 66), thereby enabling gas to enter the enclosure of the battery module 20 along a vent path 68. As shown in the illustrated embodiment of FIG. 3, the PCB assembly 58 may be disposed along an immediate vent direction (e.g., unobstructed vent direction) of the battery cells 52. As used herein, immediate vent direction and/or unobstructed vent direction refer to the path that the effluent would take if the vent shield channel 56 was not between the vents 66 of the battery cells 52 and the PCB assembly 58.

To mitigate damage to the sensitive electrical components of the PCB assembly 58, the vent shield channel 56 may be positioned directly along the vent path 68 between the battery cells 52 and the PCB assembly 58. In certain embodiments, the vent shield channel 56 may be immediately adjacent to the PCB assembly 58 (e.g., no spaces and/or intervening parts between the vent shield channel 56 and the PCB assembly 58). Accordingly, the vent shield channel 56 may block the gases (e.g., battery cell effluent) from contacting the PCB assembly 58 and any sensitive electronic components disposed on the PCB assembly 58. In certain embodiments, the vent shield channel 56 may be configured to direct the gases along a desired path that leads the gases out of the battery module 20. For example, the desired path may be substantially isolated from (e.g., may prevent contact with) the sensitive electronic components of the PCB assembly 58 as well as any other components in the battery module 20 that may be affected by the gases. The desired path that the gas may follow to vent out of the battery module 20 is discussed in more detail below with reference to FIGS. 9 and 10.

Figure 4:
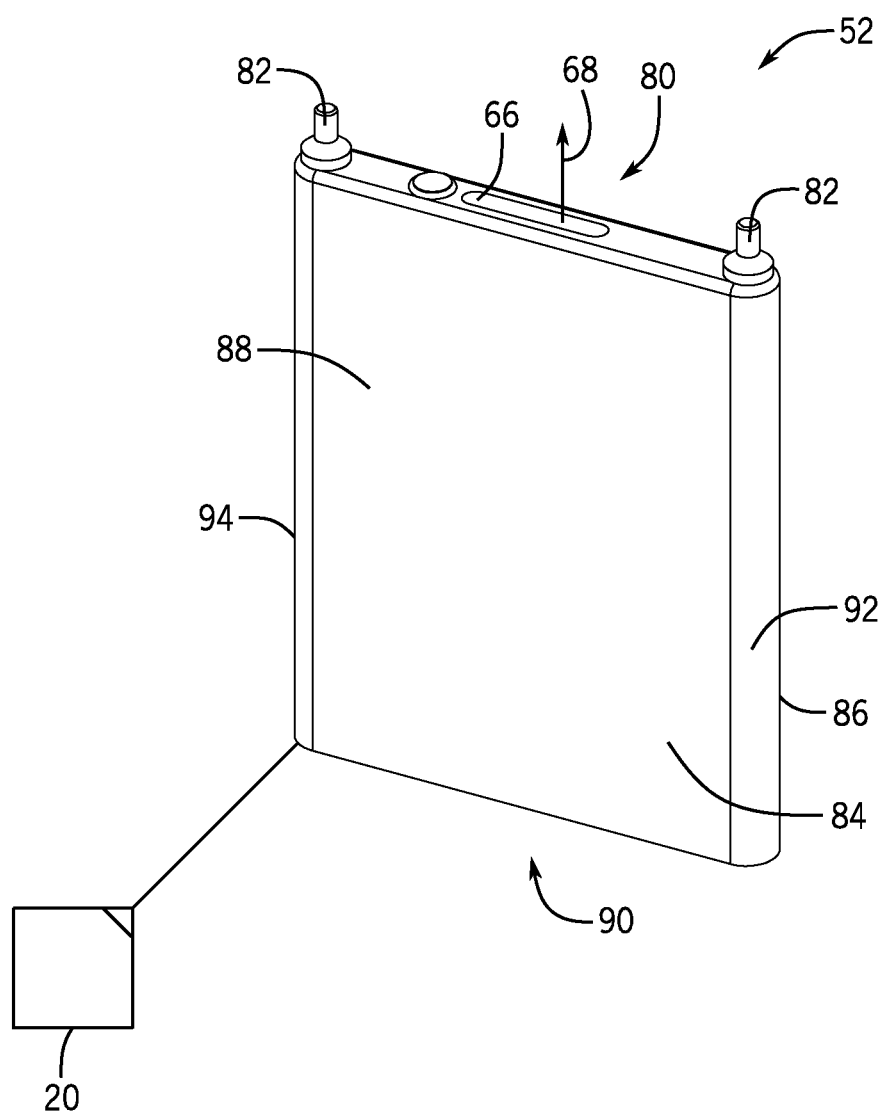
FIG. 4 illustrates an embodiment of an individual battery cell of the battery module of FIG. 3, in accordance with an aspect of the present disclosure.

To facilitate discussion of the present embodiments, FIG. 4 illustrates an embodiment of one of the battery cells 52 of the battery module 20. In a prismatic cell configuration, as shown in FIG. 4, the battery cells 52 include a top portion 80 having at least one cell terminal 82 (the illustrated embodiment has two cell terminals 82 on the top portion 80) and the cell vent 66 configured to enable pressurized gas to escape during a venting situation (e.g., when a pressure in the cell reaches or exceeds a threshold value). The illustrated battery cell 52 of FIG. 4 also includes a first face 84 and a second face 86, corresponding to the broadest part of a casing 88 of the battery cell 52. A bottom portion 90 is substantially opposite the top portion 80, and may, in some embodiments, include the cell vent 66 in lieu of the cell vent 66 on the top portion 80. The faces 84 and 86 extend between the top 80 and bottom 90 portions, and are coupled by a first side 92 and a second side 94. The first side 92 and the second side 94 may be straight, rounded, or any other suitable geometry. The casing 88 (e.g., can or housing) of the battery cell 52, which houses the active electrochemical elements of the cell 52, may be polymeric, metallic, composite, or any other suitable material. Further, it should be noted that the present embodiments are not limited to battery modules 20 having prismatic battery cell configurations, but are also intended to include embodiments where the battery cells 52 are pouch battery cells, cylindrical battery cells, and so forth.

As may be appreciated with reference to FIGS. 3 and 4, a general direction of the vent path 68 may cause vented gases (e.g., heated $CO_2$, heated vaporized solvent) to contact and/or heat sensitive electronic components in the battery module 20, thereby causing the sensitive electronic components to degrade. To mitigate these undesirable effects, the vent shield channel 56 may be integrated into the battery module 20 along the vent path of the battery cell effluent such that the battery cell effluent contacts the vent shield channel 56 before the electronic components. Further, the vent shield channel 56 may include features to contain and guide vent gas such that it does not merely contact the vent shield channel 56 and then immediately contact sensitive electronic components being protected.

Figure 5:
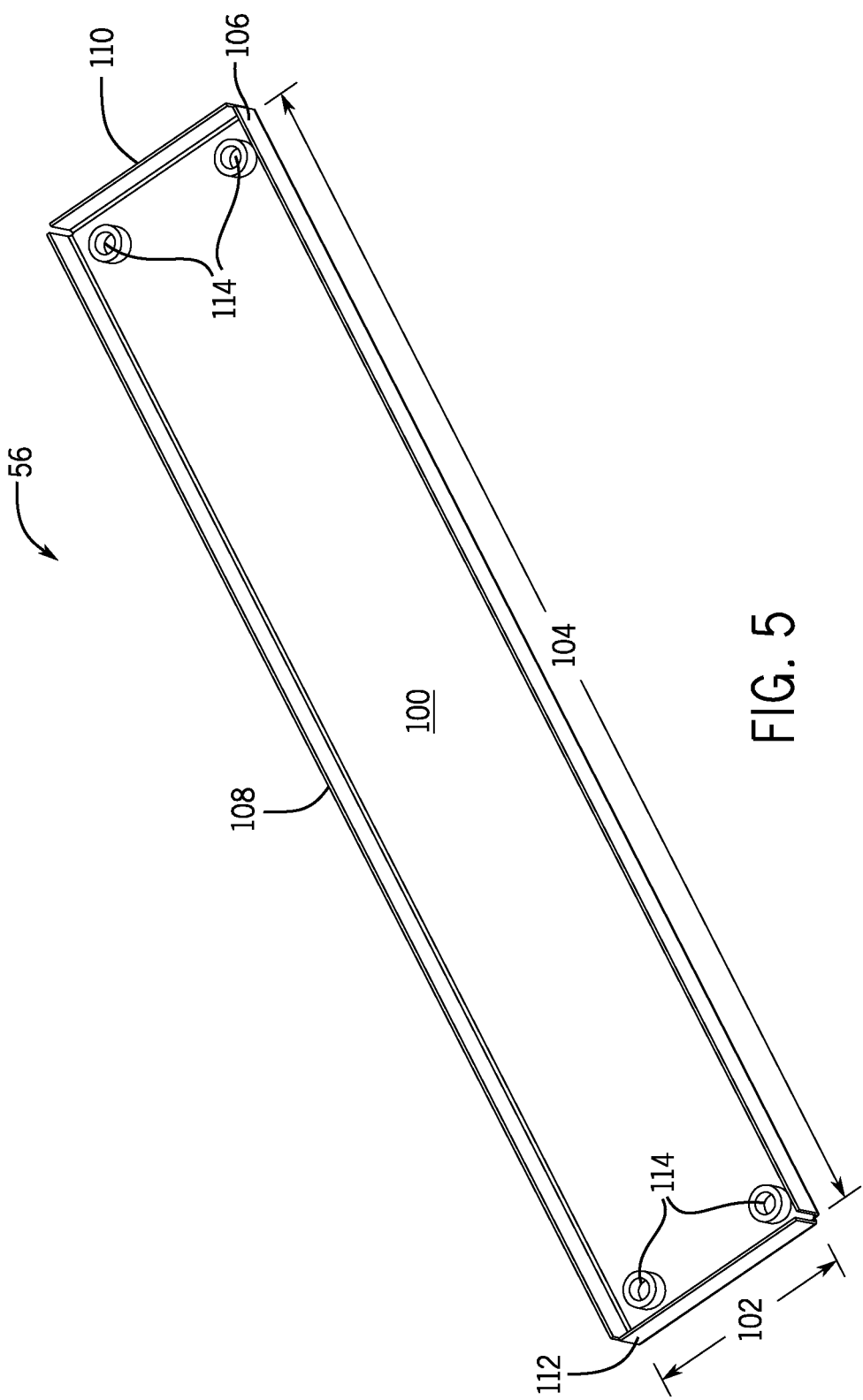
FIG. 5 illustrates a perspective view of the vent shield channel of FIG. 3, in accordance with an aspect of the present disclosure.

For example, FIG. 5 illustrates a perspective view of one embodiment of the vent shield channel 56, which may be utilized to shield sensitive electronic components in the battery module 20 from battery cell effluent. As shown in the illustrated embodiment of FIG. 5, the vent shield channel 56 includes a first surface 100 configured to face the vents 66 of the battery cells 52 when the battery module 20 is assembled. Additionally, the vent shield channel 56 may include a width 102 and a length 104. In certain embodiments, the width 102 of the vent shield channel 56 may be substantially the same as a length of the top portion 80 of an individual battery cell 52. In other embodiments, the width 102 may cover a vent region of the battery cell 52, but may leave the terminals 82 uncovered to facilitate electrical interconnections of the battery cells 52. Additionally, the length 104 of the vent shield channel 56 may correspond to the length 65 of the stack of the battery cells 52 (e.g., the sum of a width of the top portion 80 of each battery cell 52 in the battery cell stack).

The vent shield channel 56 may also include a first side 106, a second side 108, a third side 110, and a fourth side 112. In certain embodiments, the sides 106, 108, 110, and 112 may act as a sealing mechanism to briefly trap gas within the vent shield channel 56 and direct the gas toward a desired path. For example, the sides 106, 108, 110, 112 and the first surface 100 may form a cover that may be placed over the battery cells 52 (or regions thereof) of the battery module 20. Therefore, as gas (e.g., battery cell effluent) vents from the battery cell vents 66, the gas may be trapped within the vent shield channel 56 and blocked from contacting the PCB assembly 58. While a seal may not be created, this may be sufficient to avoid gas contacting the vent shield channel 56 and immediately thereafter contacting protected sensitive components. As shown in the illustrated embodiment, the vent shield channel 56 includes a five-walled polygonal shape formed by the surface 100 and the sides 106, 108, 110, 112. In other embodiments, the vent shield channel 56 may include another suitable shape to block the batter cell effluent from contacting the PCB assembly 58. The vent shield channel 56 may be formed from a flat piece of metal that has edges bent down to form the sides 106, 108, 110, and 112. Additionally, the edges of the sides 106, 108, 110, and 112 may be welded together. In some embodiments, the first side 106 and the second side 108 may include a substantially constant height throughout the length 104 (e.g., the height of the first and second sides 106, 108 are not substantially tapered).

As gas (e.g., battery cell effluent) begins to build within the vent shield channel 56, the gas may be directed out of the vent shield channel 56 toward (e.g., along) a desired vent path. For example, the sides 110 and/or 112 may include an opening that is fluidly coupled to a desired vent path for the gas. The desired vent path may be configured to prevent the gas from contacting the PCB assembly 58 and/or any other sensitive electronic components within the battery module 20. In certain embodiments, the desired vent path may lead to a vent port of the battery module 20 that enables the gas to ultimately be expelled from the battery module 20.

Moreover, in certain embodiments, the vent shield channel 56 may include a thermally conductive material (e.g., metal, ceramics) that absorbs thermal energy from the vented gas (e.g., battery cell effluent). Further, the vent shield channel 56 may be configured to disperse the thermal energy across the first surface 100 to mitigate heat distribution to other components of the battery module 20. Accordingly, the vent shield channel 56 limits the exposure of the PCB assembly 58 and other sensitive electronic components in the battery module 20 to the relatively high temperatures of the gas. In other embodiments, the vent shield channel 56 may include a non-conductive material that may be configured to absorb and/or block thermal energy from substantially affecting the PCB assembly 58. Also, the battery cell effluent may include electrolyte solvents, which can degrade the material of the PCB assembly 58. The vent shield channel 56 may prevent the effluent from substantially contacting and, thus, degrading the PCB assembly 58. Therefore, in certain embodiments, the vent shield channel 56 may include materials resistant to chemical degradation (e.g., a coating of chemically resistant plastic or other material) and impart enhanced chemical stability to the battery module 20.

Additionally, the vent shield channel 56 may include one or more spacers 114 on the first surface 100. In certain embodiments, the spacers 114 may be configured to contact the top portions 80 of the battery cells 52 such that a sufficient opening (e.g., gap) is created between the vents 66 and the first surface 100. The opening may be desirable so that the vents 66 of the cells 52 have sufficient room to deploy, and so that the battery cell effluent may escape from the battery cells 52 with minimal obstruction. Although the illustrated embodiment of FIG. 5 shows the vent shield channel 56 having four spacers 114, in other embodiments, the vent shield channel 56 may include more than four spacers 114 (e.g., 5, 6, 7, 8, 9, 10, or more). In still further embodiments, the vent shield channel 56 may include less than four spacers 114 (e.g., 3, 2, 1, or none).

In certain embodiments, the spacers 114 may include the same material as the vent shield channel 56 (e.g., may be integrally formed). In other embodiments, the spacers 114 may be separate components that are fixed to the first surface 100 of the vent shield channel 56 (e.g., via an adhesive or a fastener). In such embodiments, the spacers 114 may include a nonconductive material or a conductive material, different from that of the vent shield channel 56. Furthermore, the spacers 114 may be also be utilized to couple the vent shield channel 56 to a surface of the PCB assembly 58 (e.g., the surface facing the vents 66 of the battery cells 52). For example, the spacers 114 may act as fasteners or snaps that secure and/or couple the vent shield channel 56 to the surface of the PCB assembly 58.

Figure 6:
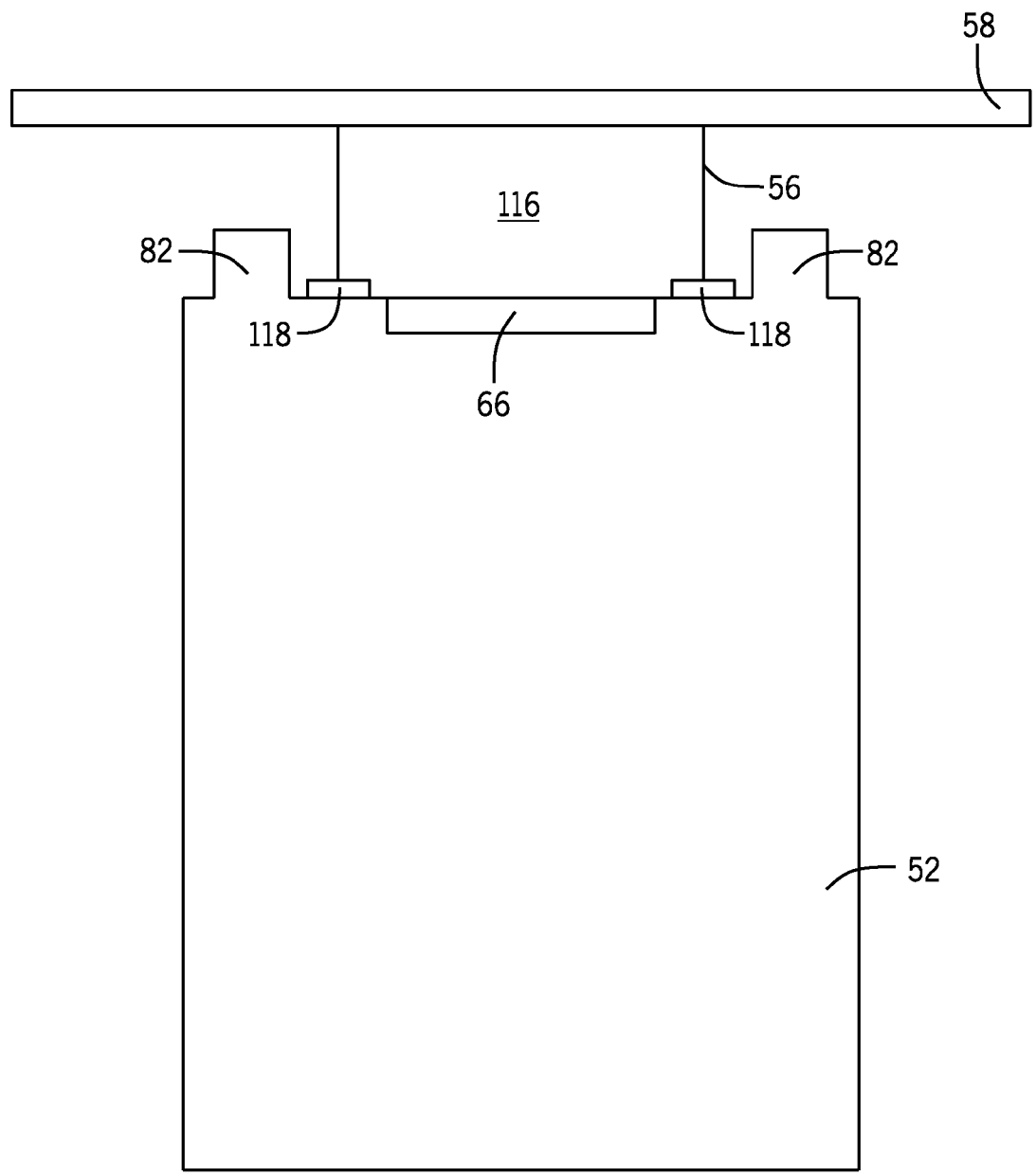
FIG. 6 illustrates an end-on view of the vent shield channel of FIG. 3 disposed over a battery cell of the battery module of FIG. 3.

As discussed above, positioning the vent shield channel 56 between the PCB assembly 58 and the vents 66 of the battery cells 52 may mitigate damage to the PCB assembly 58. FIG. 6 illustrates an end-on view of the vent shield channel 56 disposed over the vent 66 of a battery cell 52 to block battery cell effluent from contacting the PCB assembly 58. As shown in the illustrated embodiment, the vent shield channel 56 may form a sealed chamber 116 between the battery cell 52 and the PCB assembly 58. In certain embodiments, vent shield channel 56 may include insulative strips 118 between the first and second sides 106, 108 and the top portion 80 of the battery cell 52. For example, the insulative strips 118 may prevent battery cell effluent from escaping the sealed chamber 116 by removing any gaps or openings between the vent shield channel 56 and the top portion 80 of the battery cell 52. Accordingly, battery cell effluent is exhausted from the vent 66 and into the sealed chamber 116. The sealed chamber 116 may then direct the battery cell effluent along a desired vent path and prevent the battery cell effluent from contacting the PCB assembly 58.

Figure 7:
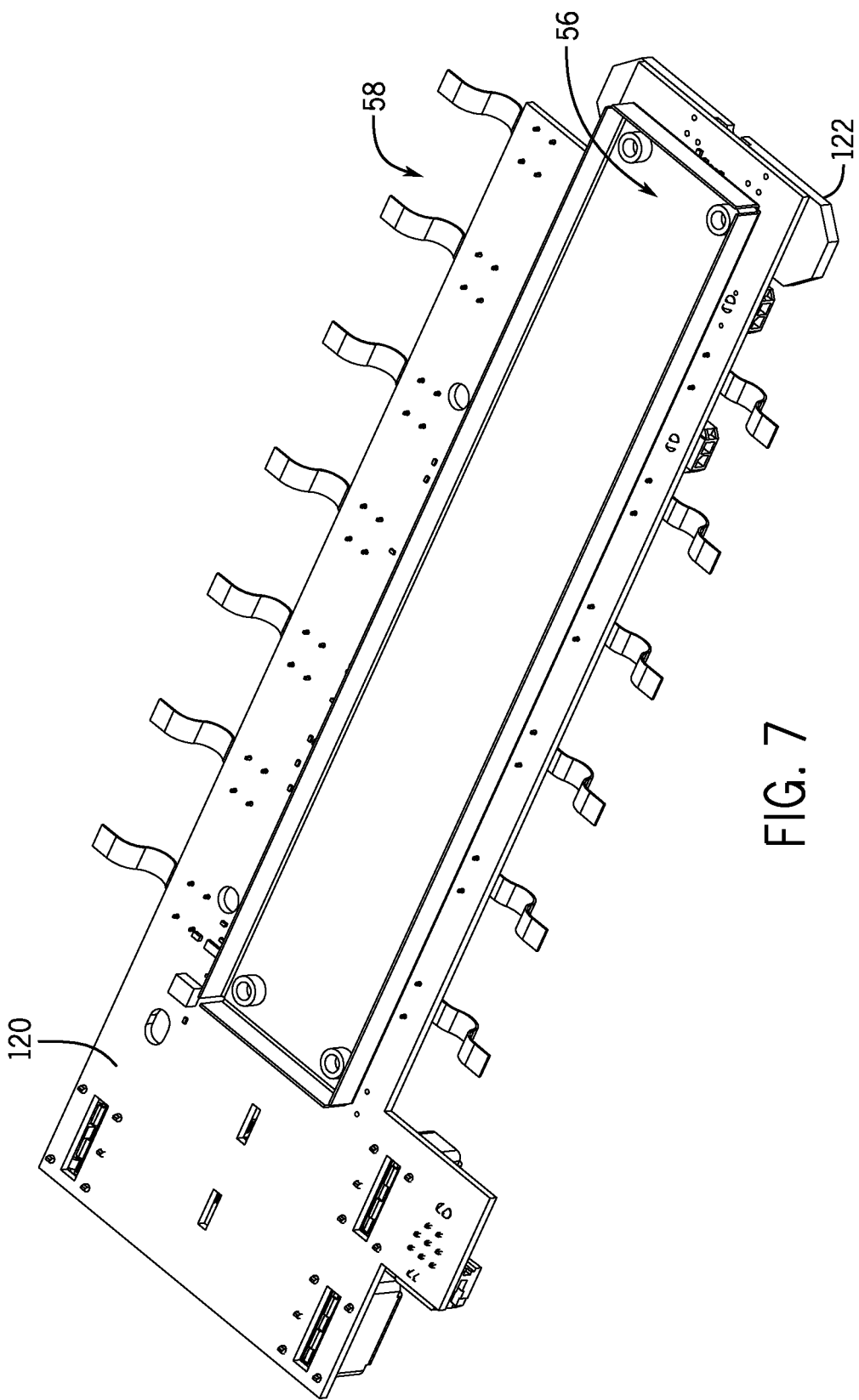
FIG. 7 illustrates a perspective view of the vent shield channel of FIGS. 3 and 5 disposed on a bottom surface of a printed circuit board (PCB) assembly, in accordance with an aspect of the present disclosure.

In certain embodiments, it may be desirable to couple the vent shield channel 56 to the PCB assembly 58 to facilitate assembly of the battery module 20 by decreasing the number of components to install in the battery module 20 (e.g., integrating the PCB assembly 58 with the vent shield channel 56). For example, FIG. 7 illustrates a perspective view of the vent shield channel 56 disposed on a bottom surface 120 (e.g., the surface facing the vents 66 of the battery cells 52) of the PCB assembly 58. As shown in the illustrated embodiment of FIG. 7, a second surface 122 of the vent shield channel 56 may be coupled to the bottom surface 120 of the PCB assembly 58. For example, the vent shield channel 56 may be coupled to the PCB assembly 58 via a fastener (e.g., a rivet, a screw, a bolt), an adhesive (e.g., glue), or a weld (e.g., laser weld). In certain embodiments, the bottom surface 120 of the PCB assembly 58 may be larger than the first and second surfaces 100, 122 of the vent shield channel 56. However, the vent shield channel 56 may still substantially block battery cell effluent from contacting the sensitive electronic components on the PCB assembly 58 because the vent shield channel 56 may form the sealed chamber 116 over the cell vents 66. The sealed chamber 116 may thereby direct the effluent away from the PCB assembly 58 and towards the desired vent path.

Figure 8:
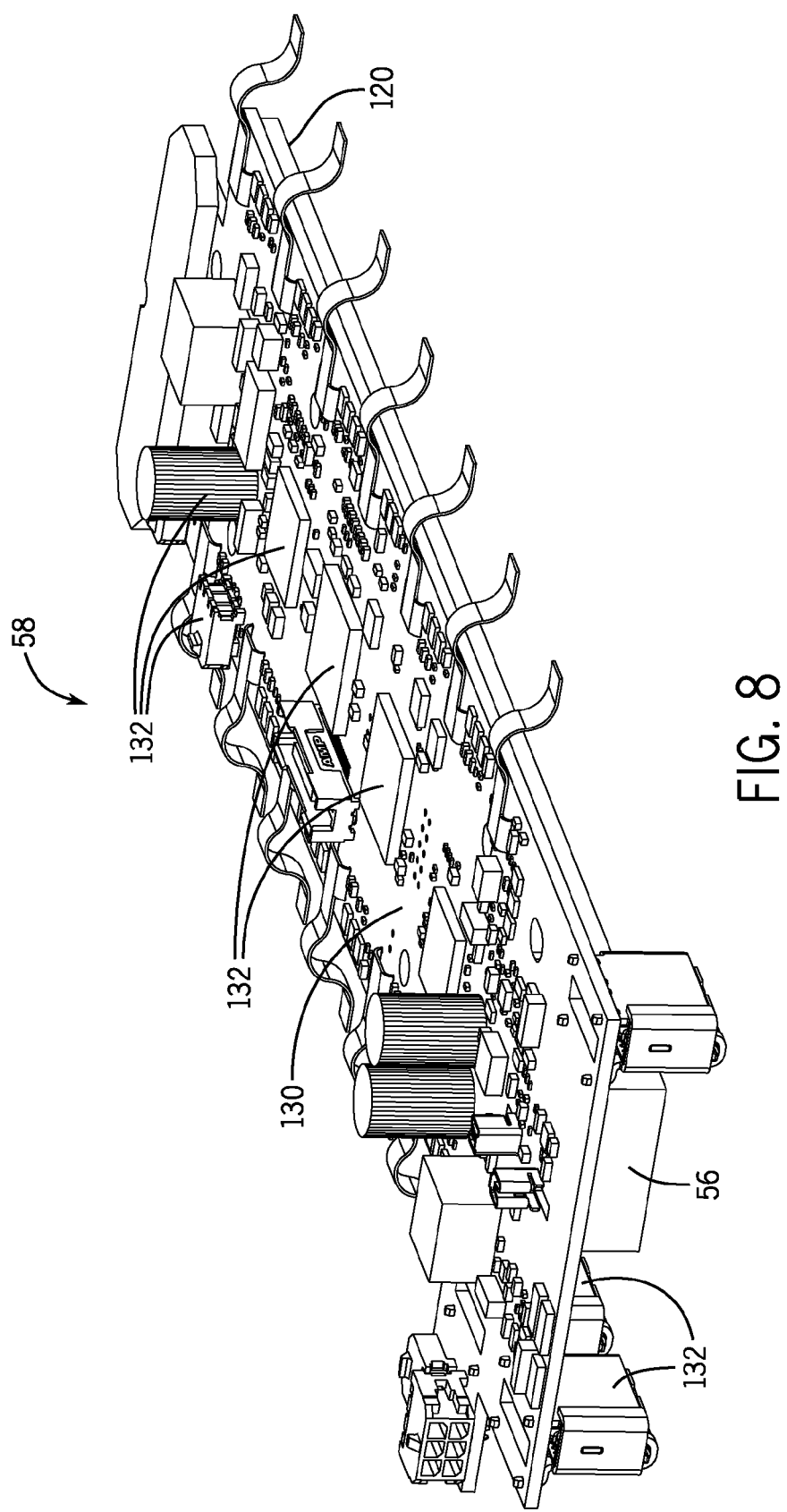
FIG. 8 illustrates a perspective view of a top surface of the PCB assembly of FIG. 6 with the vent shield channel disposed on the bottom surface of the PCB assembly, in accordance with an aspect of the present disclosure.

The PCB assembly 58 may include sensitive components that may ultimately be damaged by contact with the battery cell effluent. FIG. 8 illustrates a perspective view of a top surface 130 of the PCB assembly 58 and electronic components attached thereto. Additionally, FIG. 8 shows the vent shield channel 56 disposed on the bottom surface 120 of the PCB assembly 58. In the illustrated embodiment of FIG. 8, the top surface 130 and/or the bottom surface 120 of the PCB assembly 58 includes various electronic components 132, which may be sensitive to the battery cell effluent. Such electronic components may be utilized to perform a variety of functions with respect to operation of the battery module 20. For example, the electronic components of the PCB assembly 58 may include one or more processors and/or sensors configured to monitor a temperature and/or a voltage of the battery module 20 and/or the battery cells 52. Additionally, the PCB assembly 58 may include various electrical connectors that enable the PCB assembly 58 to communicate with other electronic components (e.g., a battery control system or a controller). Because the electrical components 132 may be sensitive to high temperatures as well as the chemicals present in the battery cell effluent, the vent shield channel 56 may be positioned directly underneath some or all of these electronics to mitigate damage to the electrical components 132 when battery cell effluent is vented from the battery cells 52 (e.g., when the battery cells 52 are overcharged).

Figure 9:
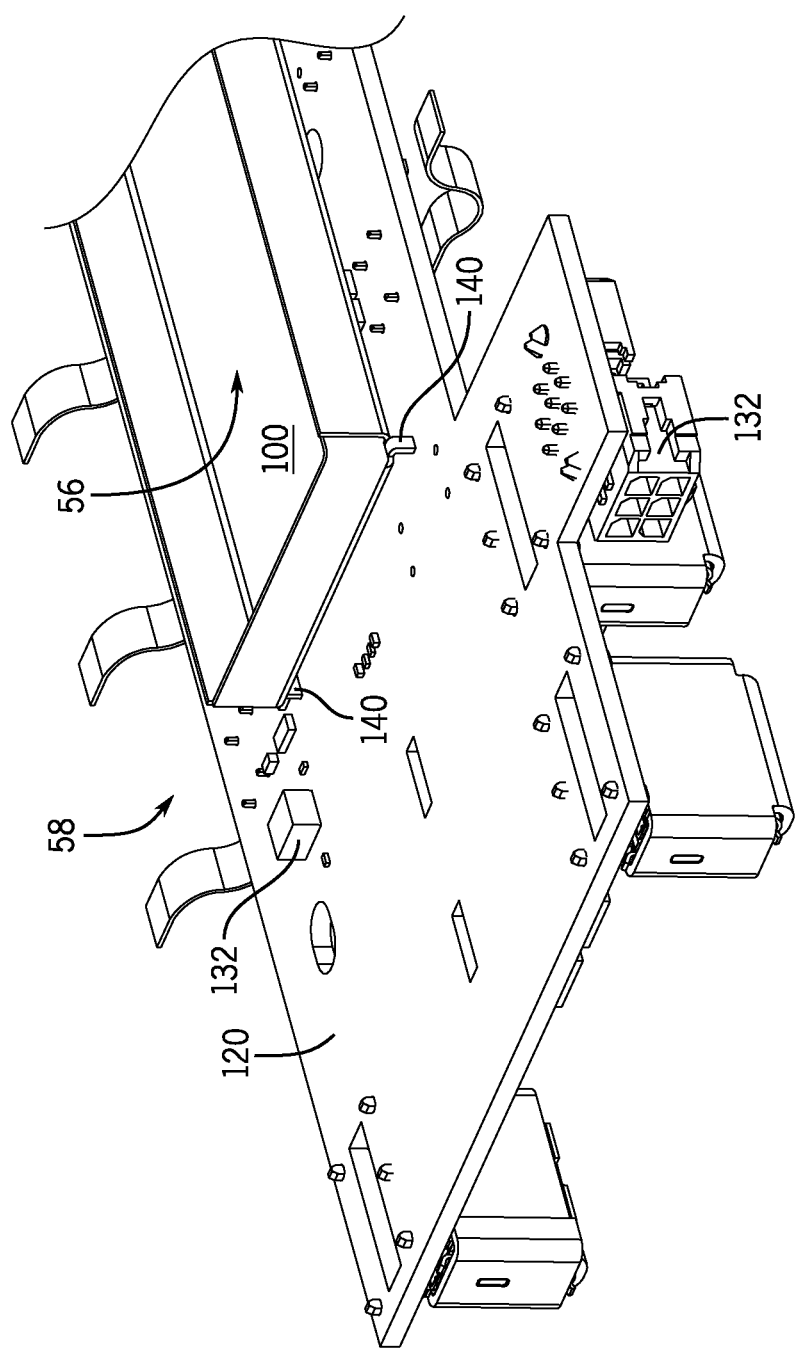
FIG. 9 illustrates a perspective view of an embodiment of a connection between the bottom surface of the PCB assembly and the vent shield channel, in accordance with an aspect of the present disclosure.

As discussed above, to position the vent shield channel 56 between the vents 66 and the PCB assembly 58, the vent shield channel 56 may be coupled (e.g., attached) to the PCB assembly 58. FIG. 9 illustrates a perspective view of an embodiment of a connection between the bottom surface 120 of the PCB assembly 58 and the vent shield channel 56. As shown in the illustrated embodiment of FIG. 9, the PCB assembly 58 may include one or more protrusions 140 disposed on the bottom surface 120. In certain embodiments, the protrusions 140 may include a conductive material such that the protrusion may be welded (e.g., laser welded) to the vent shield channel 56. In other embodiments, the protrusions 140 may include a nonconductive material. For example, the vent shield channel 56 may include one or more slots or grooves configured to receive and secure the protrusions 140 such that no weld is formed between the protrusions 140 and the vent shield channel 56. That is, the protrusions 140 may be configured to secure the vent shield channel 56 to the bottom surface 120 of the PCB assembly 58 via physical securement methods, such as a friction interference fit, clips, hinges, and so forth. In still further embodiments, the vent shield channel 56 may be further secured to the bottom surface 120 of the PCB assembly 58 via the spacers 114, as discussed above.

It should be noted that while the illustrated embodiment of FIG. 9 shows two protrusions 140 disposed on the bottom surface 120 of the PCB assembly 58, the PCB assembly 58 may include any suitable number of protrusions that enable the vent shield channel 56 to be secured to the PCB assembly 58. Accordingly, the vent shield channel 56 may block effluent from contacting the electrical components 132, and thus, may prolong a life of the battery module 20. Additionally, coupling the vent shield channel 56 to the PCB assembly 58 may simplify an assembly process of the overall battery module 20 (e.g., by combining the vent shield channel 56 and the PCB assembly 58 into a single component that is installed in the battery module 20).

Figure 10:
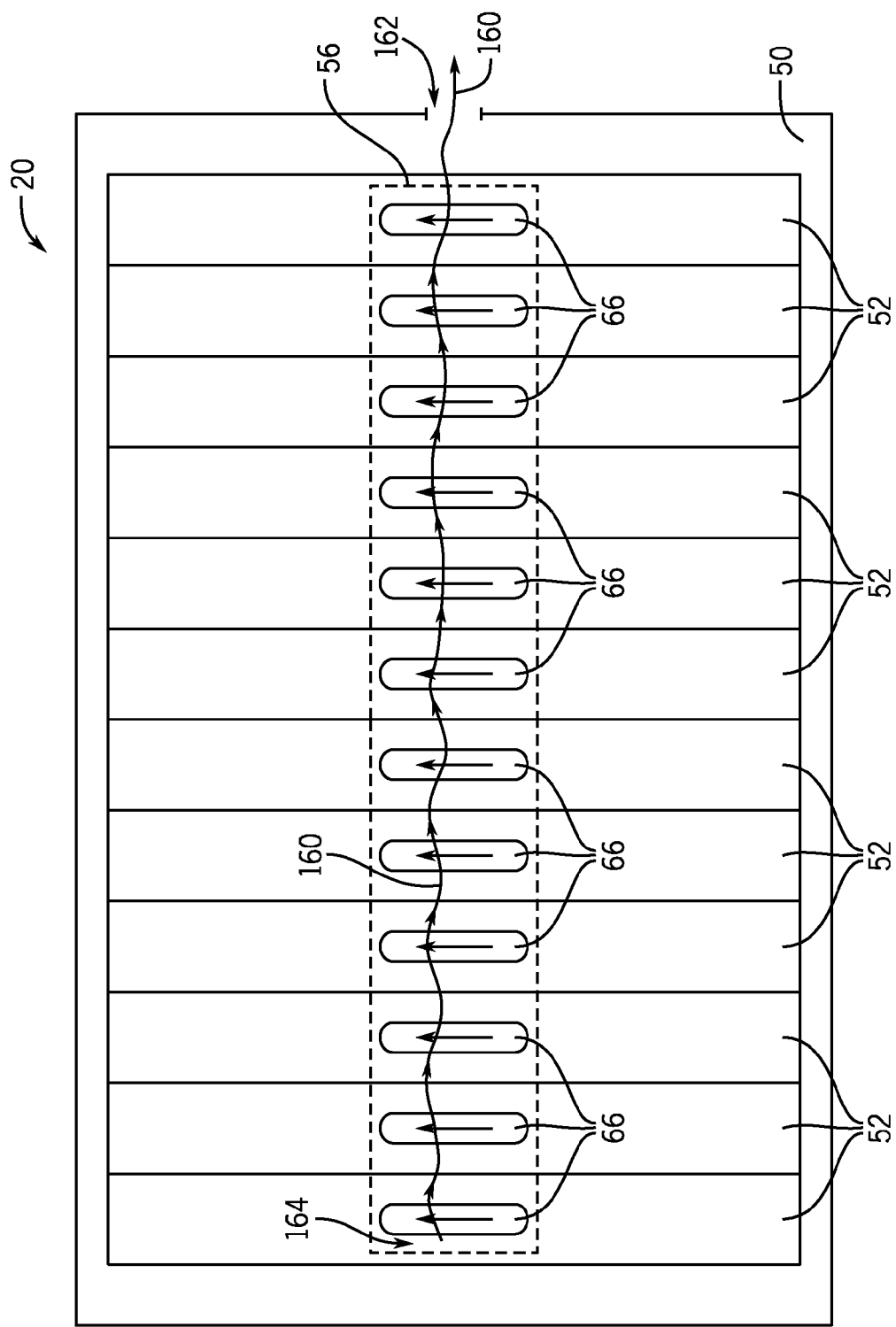
FIG. 10 illustrates a top view of the battery module of FIG. 3 with the PCB assembly hidden from view to show a vent path of battery cell effluent, in accordance with an aspect of the present disclosure.

The vent shield channel 56 may direct the battery cell effluent along a predetermined vent path so that contact between the battery cell effluent and the PCB assembly 58 is minimized FIG. 10 illustrates a top view of the battery module 20 when the vent shield channel 56 is positioned over the battery cells 52 and the PCB assembly 58 is hidden from view to show a desired vent path 160 of the battery cell effluent. As shown in the illustrated embodiment, battery cell effluent directed along the desired vent path 160 may flow from the vents 66 of the battery cells 52 to an opening 162 that may be formed in the lower housing 50. As shown in FIG. 10, effluent is released from the vents 66 of the battery cells 52 and begins to move directly upward toward the vent shield channel 56. Accordingly, because the vent shield channel 56 is substantially impermeable to the effluent (e.g., the vent shield channel 56 includes no substantial gaps or openings), the vent shield channel 56 may block the upward movement of the effluent before the effluent reaches the PCB assembly 58. The vent shield channel 56 may direct the battery cell effluent along the desired vent path 160 toward the opening 162 and out of the battery module 20. The effluent may be handled by the xEV 10 in a number of ways, including but not limited to being directed from the battery module 20 through a vent hose of the xEV 10, and to the atmosphere.

To direct the effluent towards the desired vent path 160, a pressure difference may be established between an end 164 of the vent shield channel 56 and the opening 162 in the lower housing 50. For example, as the effluent is released from the vents 66, the effluent may accumulate between the battery cells 52 and the vent shield channel 56 (e.g., in the sealed chamber 116). The pressure in the sealed chamber 116 between the battery cells 52 and the vent shield channel 56 may increase as the effluent accumulates. When a certain level of accumulation has occurred, the pressure between the battery cells 52 and the vent shield channel 56 may be larger than a pressure outside of the battery module (e.g., through the opening 162). Therefore, the effluent may flow from the higher pressure to the lower pressure, and thus from between the battery cells 52 and the vent shield channel 56 to the opening 162. In other embodiments, the battery module 20 and/or the lower housing 50 may include a vent chamber that is fluidly coupled with the desired vent path 160. In such embodiments, the battery cell effluent may be directed from the region between the vent shield channel 56 and the battery cells 52 toward the vent chamber before exiting the battery module 20 through the opening 162.

Figure 11:
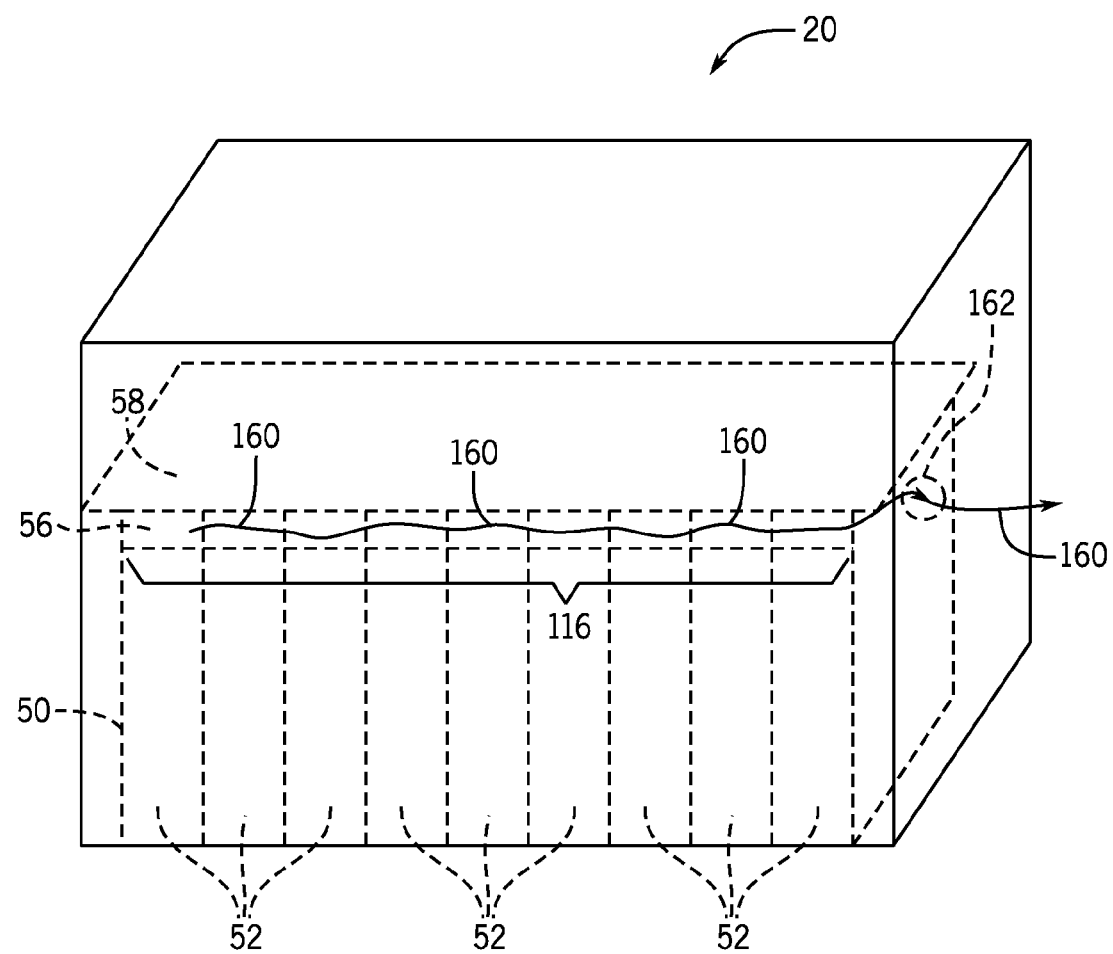
FIG. 11 illustrates a perspective view of the battery module of FIG. 3 and a vent path of battery cell effluent, in accordance with an aspect of the present disclosure.

FIG. 11 illustrates a schematic perspective view of the battery module and the desired vent path 160 of the effluent. As shown in the illustrated embodiment of FIG. 11, the effluent is trapped in a sealed chamber 116 between the battery cells 52 and the vent shield channel 56, such that the effluent may not contact the PCB assembly 58 and the electronic components 132. It should be noted that while the opening 162 is shown in a location on the lower housing 50 in FIG. 11, the opening 162 may be positioned in any suitable location to direct effluent out of the battery module 20 while blocking the effluent from contacting the PCB assembly 58.

The illustrated embodiment of FIG. 11 also depicts the opening 162 as a circular-shaped hole. In other embodiments, the opening 162 may be a square, a rectangle, a triangle, or any other suitable shape. In still further embodiments, the opening 162 may include a port (e.g., a barbed fitting) or other mechanism to which a hose or tube may be coupled. Additionally or alternatively, other ports may be positioned at similar or different regions of the battery module 20, such as a top or another side. The hose or tube may then be utilized to direct the battery cell effluent from the opening 162 and out of the vehicle 10, for example.

Figure 12:
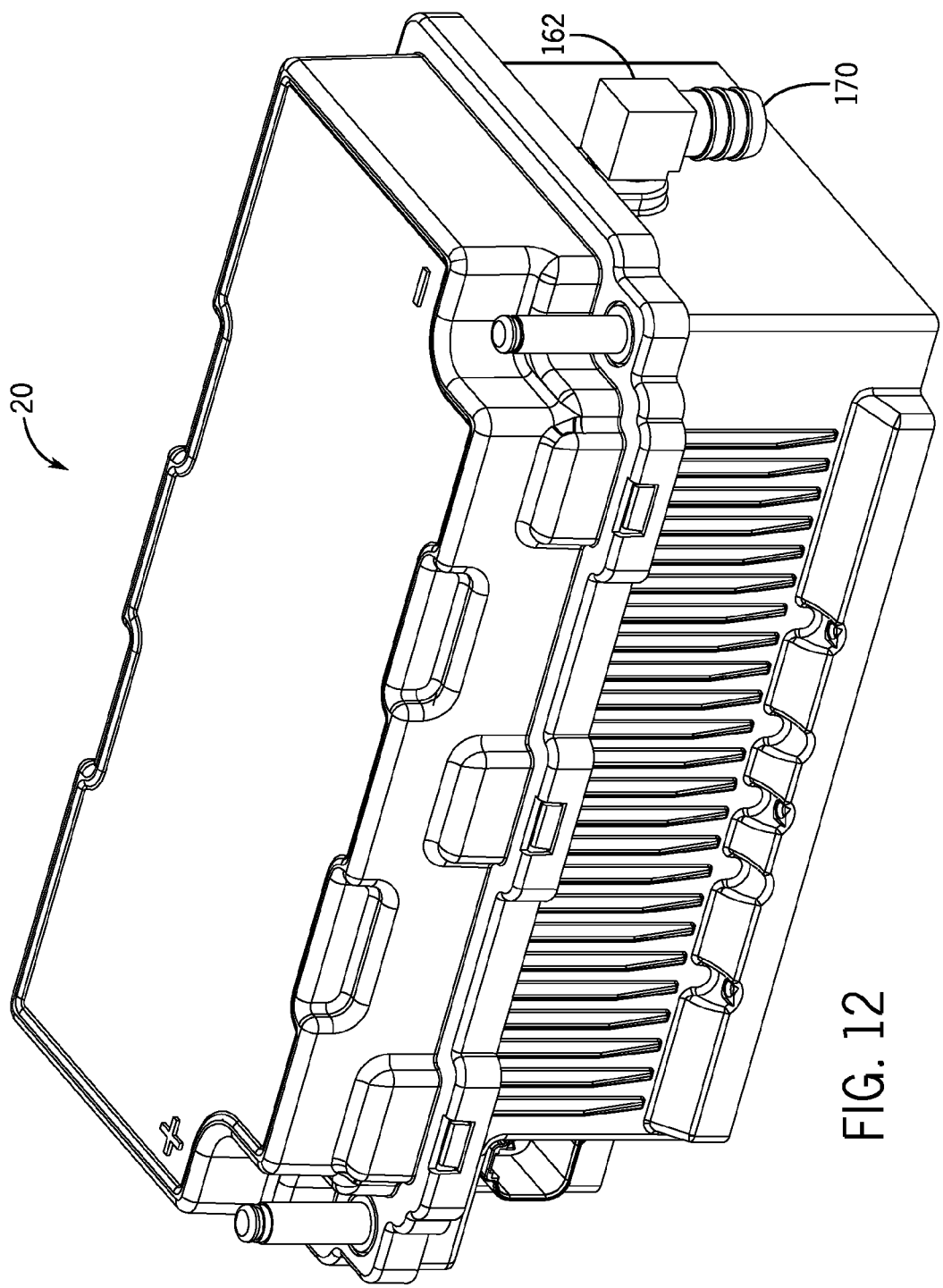
FIG. 12 illustrates a perspective view of the battery module of FIG. 3 when a cover is disposed over a lower housing to seal the battery module, in accordance with an aspect of the present disclosure.

A venting configuration may be further appreciated with respect to FIG. 12, which illustrates a perspective view of the battery module 20 when the cover 64 is disposed over the lower housing 50 to seal the battery module 20. As illustrated in FIG. 12, the opening 162 includes a port that has a barbed fitting 170 configured to secure a hose or tube that may direct the effluent to a desired location (e.g., outside of the xEV 10).

One or more of the disclosed embodiments, alone or in combination, may provide one or more technical effects useful in the manufacture of battery modules, and portions of battery modules. For example, in one aspect, it is now recognized that battery cells in a battery module may vent hot effluent gases (e.g., when the battery cells are overcharged), and such gases may physically impact electrical components of the battery module. It is also now recognized that the vented materials may also impart thermal energy to the electrical components, and the physical, chemical, and thermal stresses thereby placed upon the electrical components may result in degradation thereof, reducing the reliability and/or lifetime of the battery module. To mitigate these unwanted effects and to provide other advantages and technical effects, the present disclosure utilizes a vent shield channel integrated onto a printed circuit board configured to electrically connect to battery cells in the battery module. The vent shield channel may be configured to absorb and dissipate kinetic and thermal energy from the gases to mitigate damage to the printed circuit board and other electronic components in the battery module. Furthermore, the vent shield channel may be configured to direct vented gases toward a desired vent path and out of the battery module. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A battery module, comprising:
a housing comprising a lid;
a battery cell disposed in the housing and comprising a battery cell terminal and a battery cell vent, wherein the battery cell terminal and the battery cell vent are on an end of the battery cell, and the battery cell vent is configured to exhaust battery cell effluent into the housing;
a printed circuit board disposed in the housing, wherein the printed circuit board is positioned in an immediate vent direction of the battery cell effluent;
a vent shield channel positioned between the battery cell vent and the printed circuit board along the immediate vent direction of the battery cell effluent, wherein the vent shield channel is mounted directly onto a surface of the printed circuit board facing toward the cell vent, and the vent shield channel is configured to block the battery cell effluent from contacting the printed circuit board and to redirect the battery cell effluent along a desired vent path; and
a module vent fluidly coupled to the desired vent path and configured to direct the battery cell effluent out of the battery module.

2. The battery module of claim 1, wherein the vent shield channel forms a sealed chamber between the battery cell vent and the vent shield channel.

3. The battery module of claim 2, comprising insulative strips disposed between the vent shield channel and the end of the battery cell, and wherein the insulative strips are configured to form the sealed chamber.

4. The battery module of claim 1, wherein a surface of the printed circuit board comprises a protrusion securing the vent shield channel to the printed circuit board.

5. The battery module of claim 4, wherein the protrusion is welded to the vent shield channel.

6. The battery module of claim 4, wherein the protrusion extends into a slot of the vent shield channel.

7. The battery module of claim 1, wherein the vent shield channel comprises a thermally conductive material.

8. The battery module of claim 1, wherein the vent shield channel comprises one or more spacers forming a gap between the battery cell vent and a surface of the vent shield channel coupled to the printed circuit board.

9. The battery module of claim 8, wherein the spacers comprise a nonconductive material.

10. The battery module of claim 8, wherein the spacers are configured to couple the vent shield channel to the printed circuit board.

11. The battery module of claim 1, wherein the battery cell is a lithium ion battery cell.

12. The battery module of claim 1, wherein the printed circuit board comprises one or more sensors configured to monitor a temperature or a voltage of the battery module.

13. The battery module of claim 1, wherein the vent shield channel covers the battery cell vent such that the battery cell terminal is exposed.

14. The battery module of claim 1, wherein the vent shield channel comprises a first wall, a second wall, and a third wall, wherein the first wall is positioned substantially parallel to the printed circuit board, the second wall is substantially perpendicular to the first wall and coupled to a first end of the first wall, and the third wall is substantially perpendicular to the first wall, substantially parallel to the second wall, and coupled to a second end of the first wall.

15. The battery module of claim 1, wherein the printed circuit board is positioned over the vent shield channel, the vent shield channel is positioned over a top of the battery cell, and a bottom of the battery cell is positioned over a bottom of the housing.

16. A lithium-ion battery module, comprising:
a housing;
a stack of prismatic lithium-ion battery cells disposed in the housing, wherein each battery cell of the stack of prismatic lithium-ion battery cells comprises a battery cell terminal and a battery cell vent, and the battery cell vent of each battery cell of the stack of prismatic lithium-ion battery cells is configured to exhaust battery cell effluent in an immediate vent direction;
a lid assembly disposed in the housing and configured to electrically couple a first battery cell of the stack of prismatic lithium-ion battery cells to a second battery cell of the stack of prismatic lithium-ion battery cells;
a printed circuit board disposed in the housing, wherein the printed circuit board is positioned along the immediate vent direction of the stack of prismatic lithium-ion battery cells; and
a vent shield channel fixedly coupled to a surface of the printed circuit board, wherein the vent shield channel is positioned between the respective battery cell vents of all battery cells of the stack of prismatic lithium-ion battery cells and the printed circuit board such that the vent shield channel is configured to block battery cell effluent from contacting the printed circuit board, and wherein the vent shield channel is configured to redirect the battery cell effluent toward a vent fluidly coupled to the vent shield channel and configured to direct the battery cell effluent out of the battery module, wherein the surface of the printed circuit board comprises a protrusion securing the vent shield channel to the printed circuit board.

17. The battery module of claim 16, wherein the protrusion is welded to the vent shield channel.

18. The battery module of claim 16, wherein the protrusion extends into a slot of the vent shield channel.

19. The battery module of claim 16, comprising insulative strips disposed between the vent shield channel and all battery cells of the stack of prismatic lithium-ion battery cells, and wherein the insulative strips are configured to form a sealed chamber.

20. The battery module of claim 16, wherein the vent shield channel comprises a thermally conductive material.

21. A battery module, comprising:
a vent shield channel positioned between a stack of battery cells and a printed circuit board, wherein each battery cell of the stack of battery cells comprises a battery cell vent and a battery cell terminal, the battery cell vent of each battery cell of the stack of battery cells is configured to exhaust battery cell effluent into a housing of the battery module, and the vent shield channel is fixedly coupled directly to the printed circuit board to block the battery cell effluent from contacting the printed circuit board and to redirect the battery cell effluent towards a desired vent path.

22. The battery module of claim 21, comprising a lid assembly disposed over the stack of battery cells and configured to electrically couple the stack of battery cells to a battery module terminal, wherein the battery module terminal is configured to supply power to a load.

23. The battery module of claim 22, wherein the lid assembly electrically couples a first battery cell of the stack of battery cells to a second battery cell of the stack of battery cells in series.

24. The battery module of claim 21, comprising insulative strips disposed between the vent shield channel and the stack of battery cells, and wherein the insulative strips are configured to form a sealed chamber.

25. The battery module of claim 21, wherein the printed circuit board comprises one or more sensors configured to monitor one or both of a temperature and a voltage of the battery module.

\* \* \* \* \*